United States Patent
Crome et al.

(10) Patent No.: US 6,491,739 B1
(45) Date of Patent: Dec. 10, 2002

(54) AIR SEPARATION MODULE USING A FAST START VALVE FOR FAST WARM UP OF A PERMEABLE MEMBRANE AIR SEPARATION MODULE

(75) Inventors: Victor P. Crome, Davenport, IA (US); Alan J. Yoder, Davenport, IA (US)

(73) Assignee: Litton Systems, Inc., Los Angeles, CA (US)

(*) Notice: Subject to any disclaimer, the term of this patent is extended or adjusted under 35 U.S.C. 154(b) by 43 days.

(21) Appl. No.: 09/708,119

(22) Filed: Nov. 8, 2000

Related U.S. Application Data

(60) Provisional application No. 60/164,340, filed on Nov. 9, 1999.

(51) Int. Cl.[7] .................................................. B01D 53/22
(52) U.S. Cl. ...................... 95/14; 95/18; 95/45; 95/54; 96/8; 96/10
(58) Field of Search .................. 95/8, 12, 14, 15, 95/18, 19, 22, 23, 45, 54; 96/4, 7, 8, 10

(56) References Cited

U.S. PATENT DOCUMENTS

| | | | |
|---|---|---|---|
| 4,378,920 A | 4/1983 | Runnels et al. | 244/135 R |
| 4,508,548 A | 4/1985 | Manatt | 55/158 |
| 4,681,602 A | 7/1987 | Glenn et al. | 55/21 |
| 4,718,921 A * | 1/1988 | Makino et al. | 96/8 X |
| 4,857,082 A * | 8/1989 | DiMartino, Sr. et al. | 995/19 |
| 5,030,251 A * | 7/1991 | Rice et al. | 96/8 X |
| 5,053,058 A * | 10/1991 | Mitariten | 95/8 |
| 5,069,692 A | 12/1991 | Grennan et al. | 55/158 |
| 5,226,931 A * | 7/1993 | Combier | 95/45 |
| 5,226,932 A * | 7/1993 | Prasad | 95/45 |
| 5,281,253 A * | 1/1994 | Thompson | 95/22 |
| 5,507,855 A * | 4/1996 | Barry | 95/12 |
| 5,588,984 A * | 12/1996 | Verini | 95/18 X |
| 5,605,564 A * | 2/1997 | Collins | 96/8 X |
| 5,730,780 A * | 3/1998 | Booth, III | 95/84 X |
| 5,762,690 A * | 6/1998 | Hermann | 96/8 X |
| 5,961,692 A * | 10/1999 | Collins | 96/8 X |
| 6,197,090 B1 * | 3/2001 | Yamashita et al. | 95/12 |
| 6,296,683 B1 * | 10/2001 | Koch | 95/23 |

FOREIGN PATENT DOCUMENTS

| | | | | |
|---|---|---|---|---|
| JP | 60-169662 | * | 9/1985 | 95/54 |
| JP | 10-000322 | | 1/1998 | |
| WO | WO94/26394 | * | 11/1994 | 95/45 |

OTHER PUBLICATIONS

US 5,803,950, 9/1998, Barnhard et al. (withdrawn)*

* cited by examiner

Primary Examiner—Robert H. Spitzer
(74) Attorney, Agent, or Firm—Lowe Hauptman Gilman & Berner, LLP

(57) ABSTRACT

The present invention relates generally to on board inert gas generating systems, and more particularly, to an on board inert gas generating system having a fast warm up feature. Even more particularly, the present invention relates to a method and apparatus for quickly warming up a permeable membrane air separation system.

23 Claims, 4 Drawing Sheets

AIR SEPARATION MODULE USING A FAST START VALVE FOR FAST WARM UP OF A PERMEABLE MEMBRANE AIR SEPARATION MODULE

RELATED APPLICATION

The present application claims priority of U.S. Provisional Application Serial No. 60/164,340, filed Nov. 9, 1999, entitled "Air Separation Module Using Fast Valve for Fast Warm Up of Permeable Membrane Separators and Method of Quickly Warming Up an Air Separation Module", the disclosure of which is incorporated by reference herein in its entirety.

FIELD OF THE INVENTION

The present invention relates generally to on board inert gas generating systems, and more particularly, to an on board inert gas generating system having a fast warm up feature. Even more particularly, the present invention relates to a method and apparatus for quickly warming up a permeable membrane air separation system.

BACKGROUND OF THE INVENTION

On Board Inert Gas Generating Systems (OBIGGS) Air Separation Modules (ASM) utilizing molecular sieve employing a pressure swing adsorption (PSA) process have been used for many years to inert the fuel tanks on aircraft such as the AH-64 helicopter, C-17 transport and the V-22 tilt-Rotor aircraft. During normal operational modes, this PSA technology uses conditioned engine bleed air at typical operating temperatures that may range from −60 to 130 degrees F., and removes oxygen to generate nitrogen enriched air (NEA). This wide temperature range has a relatively minor impact on the performance of the PSA technology. The NEA product gas is used to purge the ullage space above the fuel in the fuel tanks which is initially filled with air containing oxygen at the normal concentrations of about 21% oxygen. Reducing the oxygen concentration to or below about 9% oxygen in the ullage space above the fuel in the fuel tank on the aircraft eliminates the potential for an explosion when the fuel tank is exposed to potential ignition sources such as electrical sparks or incendiary rounds. During normal aircraft start-ups the initial air temperatures received by the PSA OBIGGS can be very cold, depending upon the existing environmental conditions and how quickly warm engine bleed air is provided to the OBIGGS. The performance of OBIGGS employing the PSA technology is affected relatively little by air temperature of −60 to +130 degrees, which results in immediate, efficient generation of NEA. No warm-up or start-up time is needed.

A newer OBIGGS ASM technology is now being employed to generate NEA on some aircraft such as the USAF F-22, and will be employed on future aircraft such as the JSF. This newer technology utilizes hollow fibers of permeable membrane (PM) which operate most efficiently at operating temperatures of about +140 to +220 degrees F. The inlet supply air is introduced to the inside of one end of a bundle of thousands of small hollow fibers, and oxygen permeates through the walls and is exhausted. The nitrogen permeates through the hollow fibers much slower than oxygen, such that at the opposite end of the hollow fibers NEA is generated by the loss of oxygen via permeation through the permeable membrane fiber as the source gas traverses the length of each hollow fiber. The PM technology has the potential advantage of exhibiting good NEA generation rates at higher operating temperatures than the PSA OBIGGS technology. This can be particularly attractive for some applications where the preferred source of air is obtained from the aircraft engine bleed air, which is generally warmer than +220 degrees F. Less cooling of the air would be required to use the PM technology than the PSA OBIGGS technology. This reduces heat exchanger size and weight, which is an important benefit for aircraft applications.

All OBIGGS ASMs that employ either PSA or PM technologies utilize a flow control device to regulate the amount of NEA allowed to flow from the OBIGGS ASM. This flow control device is usually a fixed orifice that is sized to limit the NEA flow rate such that the oxygen content in the NEA product gas is limited to about 9% or less. Both PSA and PM product gas nitrogen purity is inversely proportional to the NEA product flow from the ASM. High NEA flow through the fibers allows less time for oxygen to permeate through the PM fiber which results in the NEA oxygen content to increase. A flow rate that is too high can result in the fuel tanks having explosive combinations of oxygen and fuel vapors. Too little flow results in the desired low-oxygen content, but the low NEA flow rate can significantly delay the purging of the oxygen-laden air from the fuel tank and delay the achievement of a safe inert condition.

As noted earlier PM ASMs operate best at higher operating temperatures of +140 to +220 degrees F. When aircraft are required to "scramble" and be airborne rapidly, the time to inert the fuel tanks to a safe condition quickly is important. Waiting for the PM to reach the higher normal PM operating temperature results in a delay in reaching optimum performance and reduces the NEA generation rate available during this start-up or warm-up period. The PM must be warmed up quickly or longer times to inert the fuel tanks will be required. Some fighter aircraft missions require the aircraft to be airborne in five minutes or less; however, it can take longer than that just to warm up the PM ASM and attain near normal performance. Thus, a need exists in the art for a system capable of warming up a PM ASM in five minutes or less.

SUMMARY OF THE INVENTION

It is, therefore, an object of the present invention to reduce the time required to warm up a PM ASM.

Another object of the present invention is to provide a PM ASM system which provides warm inlet air from the engine bleed air system into the PM ASM.

Another object of the present invention is to initially increase NEA flow through the PM ASM to speed up the warming of the hollow fibers in the PM.

Yet another object of the present invention is to provide a method and apparatus that directs a portion of the warm engine bleed air into the outer shell of the PM ASM.

Still another object of the present invention is to provide a method and apparatus which can utilize NEA product flow and/or engine bleed air to warm the hollow fibers of the PM separator.

Yet another object of the present invention is to provide NEA product gas having an oxygen content of about 9% or less in less than five minutes.

Another object of the present invention is to provide a permeable membrane air separation system that can be warmed up in less than five minutes.

Advantageously, the present invention is directed to an apparatus and method for warming up the PM ASM to obtain near normal performance in approximately three minutes. This compares to present performance of approximately 7.5 minutes.

The present invention uses a fast start valve that allows an increased flow of NEA through the PM ASM that is then directed into the outer shell of the PM ASM. This increased flow of warm inlet air from the engine bleed air system into, through around each hollow fiber, and accelerates the warming of the hollow fibers in the PM ASM. An alternative approach accelerates PM ASM warm up by directing a portion of the warm inlet air directly into the outer shell of the PM ASM while the normal amount of NEA is allowed to flow through the inside of the PM fibers. A third approach is to direct a combination of increased NEA flow and inlet airflow into the outer shell to accelerate warming of the PM ASM.

These and other objects of the present invention are achieved in an air separation module assembly having fast warm up capability. The air separation module is connected to a source of warm air. An air separation module has an inlet, an outlet, an exit port and an entry point. The inlet is connected to the source of warm air. A valve is connected to the entry point. The valve is also connected to at least one of the exit port and the source of warm air.

The foregoing objects of the present invention are achieved by a method of quickly warming up an air separation module. Warm air is flowed through an air separation module to separate nitrogen gas therefrom. A portion of the separated nitrogen gas is directed to an ullage space of a fuel tank. A portion of the separated nitrogen gas is directed back into the air separation module.

The foregoing and other objects of the present invention are achieved by a method of quickly warming up an air separation module. Warm air is flowed through an air separation module to separate nitrogen gas therefrom. A portion of the separated nitrogen gas is directed to an ullage space of a fuel tank. A portion of the separated nitrogen gas is directed back into the air separation module. A source of warm air is directed into an entry point of an air separation module. The warm air is then exhausted from the air separation module.

The foregoing objects of the present invention are achieved by a method of quickly warming up an air separation module. Warm air is flowed through an air separation module to separate nitrogen gas therefrom. A portion of the separated nitrogen gas is directed to an ullage space of a fuel tank. A portion of the separated nitrogen gas is directed back into the air separation module. Air is directed from a source of warm air into an entry point of an air separation module and exhausts the warm air from an exit port of the air separation module.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
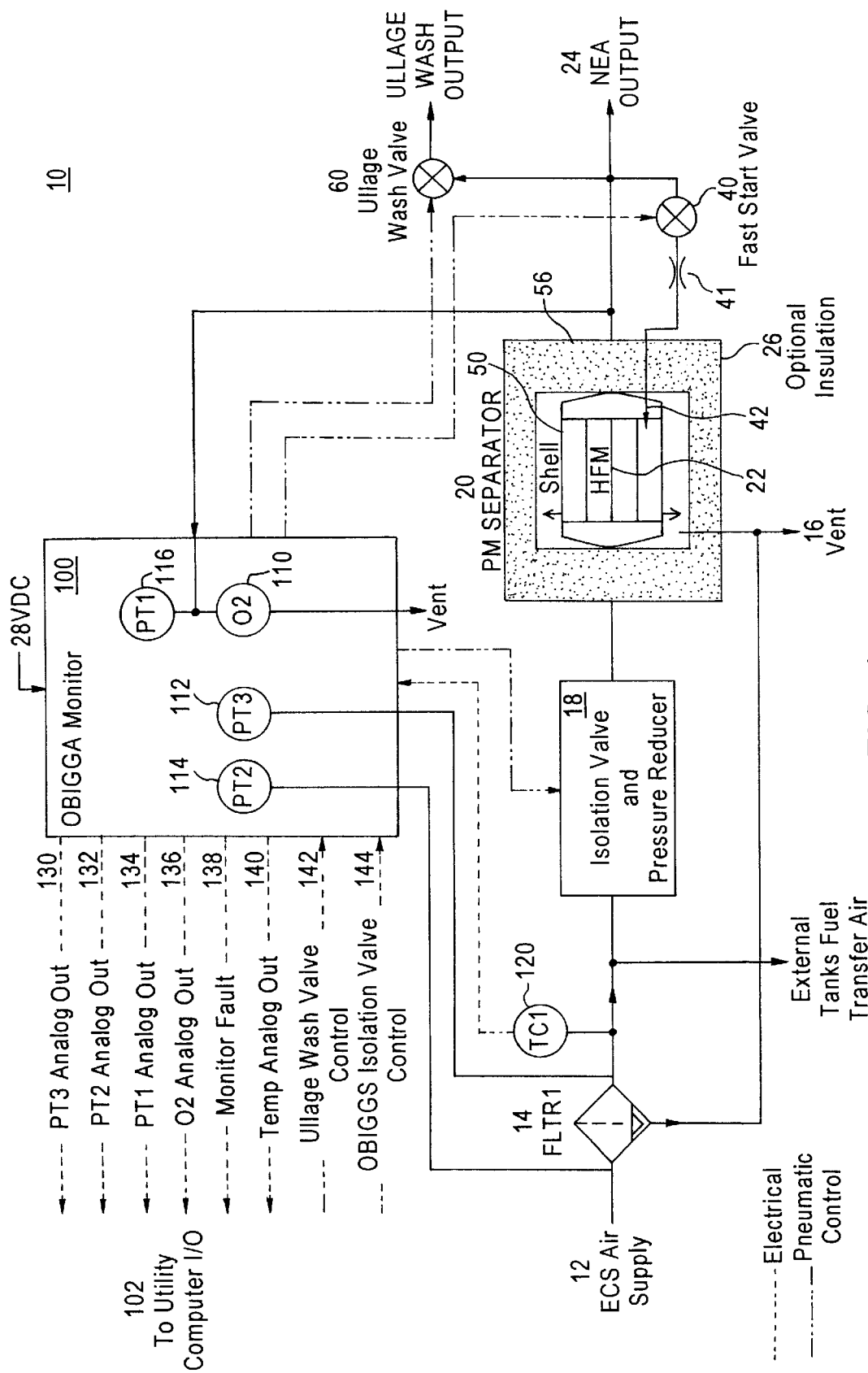
FIG. 1 is a schematic illustration of the PM OBIGGS air separation module with fast start valve that directs increased NEA flow through the PM fibers and into the PM ASM outer shell.

FIG. 1 is a schematic illustration of OBIGGS ASM, generally depicted at 10, and includes optional communication interfaces that allow an aircraft computer to monitor and control the operation of the OBIGGS. The OBIGGS control autonomy could range from all aircraft to all self-contained, depending on program requirements.

Source-air 12 from an engine compressor and heat exchanger, environmental control system (ECS), or mechanically driven compressor is introduced to a PM separator 20 through an inlet air coalescing filter 14. An optional exterior insulating shell 26 (FIGS. 1–3) surrounding the PM separator 20 can be used if needed to help maintain the preferred operating temperature of the PM separator 20. The coalescing filter 14 removes excess water and other condensed contaminants and vents the contaminants overboard through a vent 16. The filtered air is then directed to an isolation valve and optional pressure reducer 18 that can close and prevent air from entering the PM separator 20 when required. The isolation valve and optional pressure reducer 18 reduces the downstream pressure during normal operation to reduce the ASM component structures required to withstand proof and burst pressures, and/or to limit air consumption rate as system requirements dictate. The reduced pressure air then flows into the PM separator 20 where oxygen and water vapor permeate through the walls of the hollow fiber membranes 22 and are vented overboard through the vent 16, which is also connected to an outlet port 54 (FIG. 4) formed in an outer shell 50 of the PM separator 20. The NEA product flows through the PM separator 20 and through the hollow membranes 22 to one of three possible outlet flow paths. During normal or steady state operation, a first flow path 24 is used. The first flow path exits the PM separator 20 through a nitrogen outlet 56 located at one end of the PM separator 20. The first flow path 24 for the NEA product gas is the normal flow path to the aircraft plumbing which normally includes a NEA pressure reducing valve or fixed flow controlling orifice (not shown) and additional aircraft plumbing to each fuel tank (not shown). The second flow path is to and through an optional ullage wash valve 60 that can be activated as needed to provide an increased NEA flow to the fuel tank ullage to more quickly flush the ullage of oxygen laden air during the initial period of inerting the fuel tanks. This ullage wash valve 60 can be used to reduce the initial time to inert the fuel tanks. After the tanks are inert, the ullage wash valve 60 can be closed, and the first flow path 24 continues to provide NEA flow to the tanks to maintain the inert condition as the fuel is consumed. The ullage wash valve 60 can be activated during aircraft descents to provide the higher NEA flow rates required to equalize the internal fuel tank pressure with the increasing surrounding atmospheric air pressure. This can prevent atmospheric air from entering the tanks during the aircraft descent to lower altitudes, which can cause the fuel tanks to acquire an explosive air-fuel ratio. The second flow path is from the first flow path 24 to the ullage wash valve 60. Thus, a portion of the NEA product gas is redirected to the ullage wash valve 60. The third flow path is to and through the fast start valve 40, and through an orifice 41 into an entry point 42 formed into the outer shell 50 of the ASM 20. This fast start valve 40 is opened during the first few minutes of operation to provide accelerated warming of the PM ASM by increasing the flow of warming inlet air and of NEA from the PM 20 above the normal flow. This accelerates the flow of warm source air into and through the PM separator 20 and shortens warm-up time and the time to inert the fuel tanks. The flow of NEA through the fast start valve 40 is directed through an entry point 42 into the outer shell 50 and around the hollow fibers 22 and through a flow-limiting orifice 41 to further enhance initial ASM warming. This fast start NEA flow through the outer shell 50 and around the outer surfaces of the hollow fibers 22 is combined with ASM permeate and the contaminants from the coalescing filter drain, and vented overboard through an outlet 54 (see FIG. 4) and through the vent 16.

Figure 4:
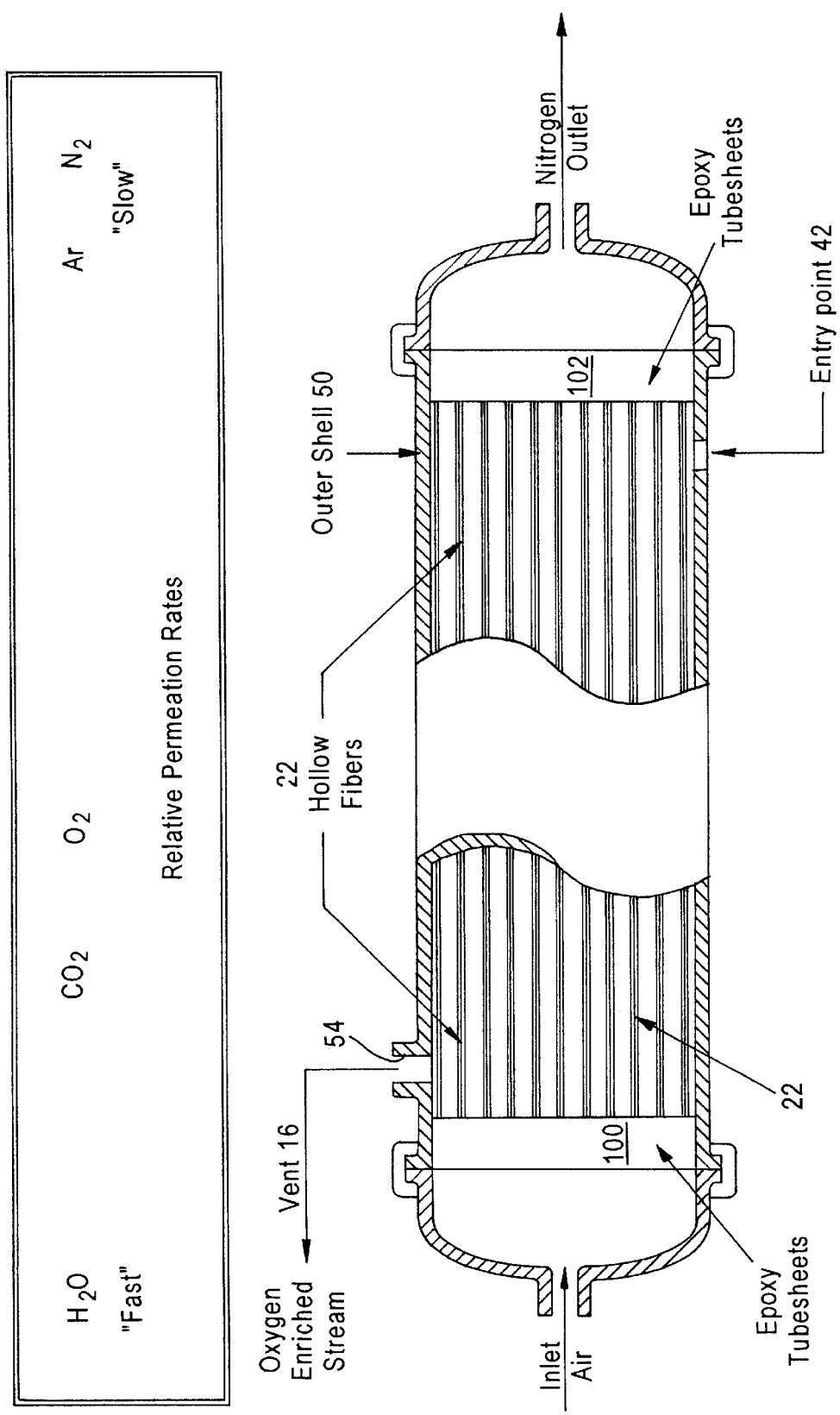
FIG. 4 is a cross-sectional schematic of the PM OBIGGS ASM.

It is desirable to position the entry position of the gas from the fast start valve 40 into the outer shell 50 relative to the vent 16 so that the warming of the hollow PM fibers is optimized. FIG. 4 shows one of the possible combinations of entry point 42 and vent 16. These positions may vary depending on the system packaging design requirements. This fast start valve 40 can be activated for a predetermined period of time or until the PM ASM temperature is reached as measured by a temperature sensor located in the PM separator 20 or outlet flow plumbing. Alternately, the fast start valve 40 could utilize a variable flow control area that is adjusted as a function of time or temperature to further optimize the warming effect.

The ASM 20 includes an OBIGGS monitor 100 that checks and reports critical operating parameters to a self-contained computer or to the aircraft computer that analyzes the data and controls the OBIGGS operation through the OBIGGS monitor interface 102. The monitor 100 is electrically powered. The monitor 100 includes an oxygen sensor 110 that measures the oxygen content of the NEA product gas and reports it to the aircraft computer. The monitor 100 also includes transducers for measurement and reporting of the pressures upstream 114 and downstream 112 of the coalescing filter 14, and downstream 116 of the PM separator 20. The inlet air temperature is also measured by a thermocouple 120 and reported to the controlling computer. This information is monitored by the aircraft computer, which initiates appropriate actions to the ASM through the OBIGGS monitor 102, and indicates when maintenance actions are required.

The first flow path 24 is always open to let NEA to continuously flush oxygen from the ullage. The ullage wash valve 60 is opened for additional flow to accelerate $O_2$ removal for a time interval, or until the aircraft reaches specific altitude, or until the tank is sensed to be safe by an external oxygen sensor located in the fuel tank (not shown). A thermocouple (TC1) 120 is used to monitor the air temperature exiting the filter 14. The optional communication interfaces between the OBIGGS monitor 100 and the aircraft computers include a PT3 analog out line 130, a PT2 analog out line 132, a PT1 analog out line 134, an 02 analog out line 136, a monitor fault line 138, a temperature (TC1) analog out line 140, a ullage wash valve control 142, and an OBIGGS isolation valve control 144. It is readily apparent that these analog signals could also be digital signals, depending upon the desired system architecture. During operation, the monitor 100 controls the fast start valve 40 electrically, or pneumatically with pilot control pressure from a solenoid valve. The monitor 100 controls the isolation valve and pressure reducer 18 electrically or pneumatically. The monitor 100 also controls the ullage wash valve 60 electrically or pneumatically. The OBIGGS monitor 100 receives pneumatic pressure from each of the three pneumatic lines that provide pressure signals from each of the three pressure transducers 112, 114, and 116.

In operation, in FIG. 1, the fast start valve 40 is opened during warm-up until the operating temperature of the hollow fibers 22 are between +140 and +220 degrees F. This temperature can be measured using a thermocouple (not shown) in the outlet path 24. The NEA flow will exit the PM separator 20 through outlet path 24 and be redirected through the fast start valve 40 into orifice 41 and then through the entry point 42. The orifice 306 and the check valve 302 are located in line 200 and the orifice 304 and the check valve 300 are located in a line 202 connecting the outlet path 24 of the inlet of the fast start valve 40. The check valve 300 prevents warm engine bleed air from mixing with the NEA output and the check valve 302 prevents NEA output from flowing back to the inlet of the PM separator 20.

In operation, the third embodiment provides the fastest warm up because both warm engine air and NEA product are used to heat the hollow fibers 22. Advantageously, the entry point 42 is located as far from the exit 54 to allow maximum heat exchange time and surface area to warm the outer surfaces of the hollow fibers 22.

Figure 2:
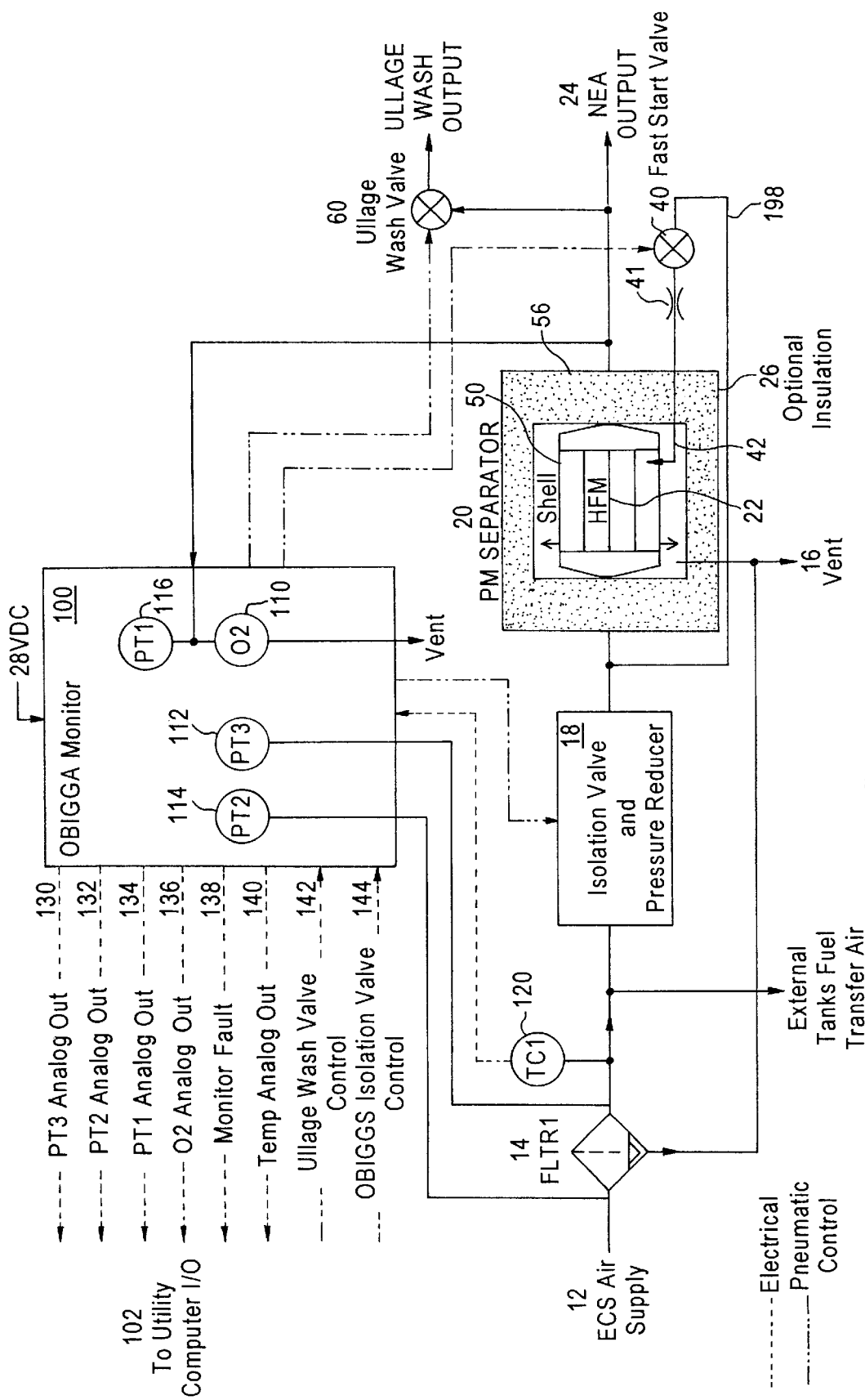
FIG. 2 is a schematic illustration of the PM OBIGGS ASM with a fast start valve that directs warm inlet air into the outer shell of the PM ASM.

FIG. 2 shows an alternate approach that directs warm inlet air directly into the PM ASM shell 50 before passing through the PM separator for the purpose of accelerating the warming of the hollow membrane fibers 22. FIG. 2 is identical to FIG. 1 except that output line 24 is not connected to fast start valve 40 but instead a separate and different line 198 that connects the outlet of the isolation valve and optional pressure reducer 18 to the inlet of the fast start valve 40. This approach uses inlet air directly for warming the PM ASM instead of using the increased NEA product flow during the warm up period.

In operation in FIG. 2, a portion of the warmer engine bleed air is directed from the outlet of the isolation valve 18 to the fast start valve 40 and through orifice 41. The warm engine bleed air then enters the PM separator 20 through the entry point 42. This approach speeds up the warming of the hollow fibers 22 in the PM separator. The product NEA gas flows to either the first or second flow path described previously.

Figure 3:
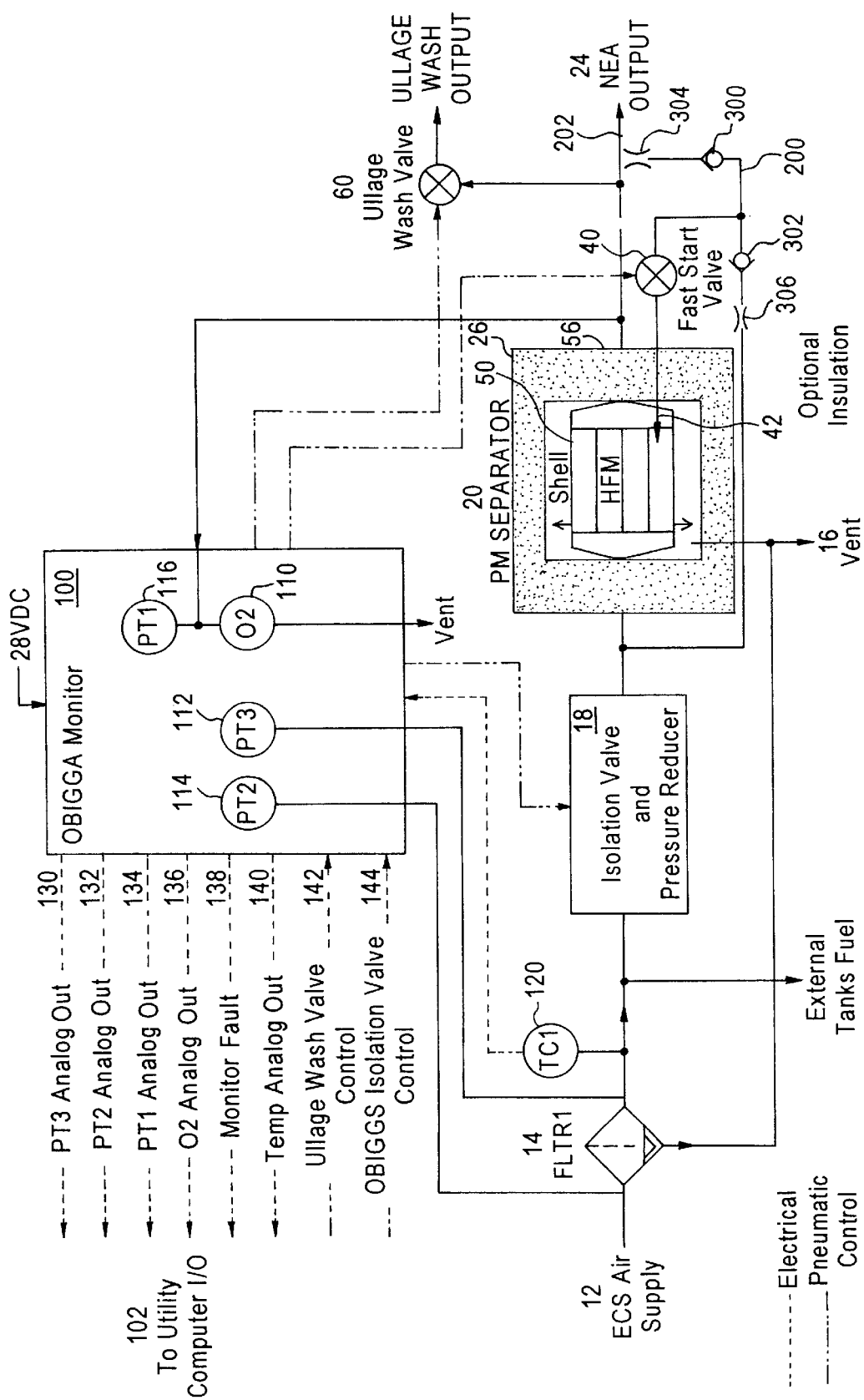
FIG. 3 is a schematic illustration of the PM OBIGGS ASM with a fast start valve that directs a combination increased NEA flow and warm inlet air into the PM ASM outer shell.

A third embodiment is shown in FIG. 3, where the inlet air and NEA product gases are combined together and directed into the ASM shell to accelerate warming of the PM hollow fibers. The preferred embodiment is depicted in FIG. 3, which is a combination of FIGS. 1 and 2 and enables the greatest flexibility in optimizing the system performance for a variety of OBIGGS applications. Check valves 300, 302 are added to prevent mixing of the air and NEA gases. Flow control orifices 304, 306 are included to control gas flow rates from each source to allow optimization of the system operating parameters as they are affected by source air availability, warm up time allowed, NEA purity, NEA flow rates and other requirements.

As depicted in FIG. 4, the hollow fibers 22 are sandwiched between a first epoxy tubesheet 100 and a second epoxy tubesheet 102. An inlet end of each of the hollow fibers 22 is in contact with one surface of the first epoxy tubesheet and an opposite end of each of the hollow fibers 22 is in contact with one surface of the second epoxy tubesheet. The entry point 42 is located near the second epoxy tubesheet 102 and the exit port 54 is located near the first epoxy tubesheet 100. The first and second epoxy tubesheets 100, 102 permit flow of the inlet air and the nitrogen output, respectively.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of quickly warming up an air separation module, comprising the following steps:

flowing warm air through an air separation module to separate nitrogen gas therefrom;

first directing a portion of the separated nitrogen gas to a ullage space of a fuel tank; and second directing a portion of the separated nitrogen gas back into the air separation module.

2. The method of claim 1, wherein said air separation module uses a permeable membrane.

3. The method of claim 1, wherein the fast warm up capability permits the air separation module to output nitrogen gas having 9% or less oxygen in five minutes or less.

4. The method of claim 1, further comprising monitoring the air separation module and after a predetermined threshold has been met discontinuing said second directing step.

5. The method of claim 1, further comprising directing separated nitrogen gas to an ullage wash valve and washing the ullage with the nitrogen gas.

6. The method of claim 1, wherein the air separation module operates at a steady state temperature of about +140 to +220 degrees F.

7. The method of claim 1, comprising venting the air from source of warm air overboard after it passes over hollow fibers in the air separation module.

8. A method of quickly warming up an air separation module, comprising:

directing air from a source of warm air into an entry point of an air separation module;

exhausting the warm air from an exit port of the air separator module;

flowing warm air through an air separation module to separate nitrogen gas therefrom;

first directing a portion of the separated nitrogen gas to a ullage space of a fuel tank; and second directing a portion of the separated nitrogen gas back into the air separation module.

9. The method of claim 8, wherein the air separation module uses a permeable membrane.

10. The method of claim 8, wherein the method permits the air separation module to output nitrogen gas having 9% or less oxygen in five minutes or less.

11. A method of quickly warming up an air separation module, comprising the following steps:

flowing warm air through an air separation module to separate nitrogen gas therefrom; first directing a portion of the separated nitrogen gas to a ullage space of a fuel tank; second directing a portion of the separated nitrogen gas back into the air separation module; directing air from a source of warm air into an entry point of the air separation module; and exhausting the warm air from an exit port of the air separation module.

12. The method of claim 11, wherein the air separation module uses a permeable membrane.

13. The method of claim 11, wherein the method permits the air separation module to output nitrogen gas having 9% or less oxygen in five minutes or less.

14. The method of claim 11, further comprising monitoring the air separation module and after a predetermined threshold has been met discontinuing said second directing step.

15. An air separation module assembly having fast warm up capability and connected to a source of warm air, comprising:

an air separation module having an inlet, an outlet, an exit port and an entry point, said inlet connected to the source of warm air and for providing an inert gas to a fuel tank; and a valve is connected to said entry point, said valve connected to at least one of said exit port and the source of warm air.

16. The air separation module assembly of claims 15, further comprising a monitor that checks and reports operating parameters of said air separation module assembly to a computer.

17. The air separation module assembly of claim 15, wherein said exit port and said entry point are located on approximately opposite ends of said air separation module.

18. The air separation module assembly of claim 15, wherein said air separation module uses a permeable membrane.

19. The air separation module assembly of claim 18, wherein the fast warm up capability permits the air separation module to output nitrogen gas having 9% or less oxygen in five minutes or less.

20. The air separation module assembly of claim 15, wherein the source of warm air is one of engine bleed air, environmental control system air or air from a compressor.

21. The air separation module assembly of claim 15, further comprising an exterior insulating shell surrounding the air separation module.

22. The air separation module assembly of claim 15, further comprising a first orifice and a first check valve positioned between the source of warm air and said valve and a second orifice and a second check valve positioned between said outlet and said valve.

23. The air separation module assembly of claim 15, wherein said air separation module has an outer shell and a first tubesheet and a second tubesheet and a plurality of hollow fibers positioned between said first and second tubesheets.

* * * * *